United States Patent
Stolyar et al.

(10) Patent No.: US 8,295,231 B2
(45) Date of Patent: Oct. 23, 2012

(54) METHOD OF DYNAMIC RESOURCE ALLOCATIONS IN WIRELESS SYSTEMS

(75) Inventors: Aleksandr Stolyar, Somerset, NJ (US); Harish Viswanathan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1254 days.

(21) Appl. No.: 11/770,315

(22) Filed: Jun. 28, 2007

(65) Prior Publication Data

US 2009/0003266 A1 Jan. 1, 2009

(51) Int. Cl.
*H04W 4/00* (2009.01)
*H04W 72/00* (2009.01)
(52) U.S. Cl. ...... 370/329; 455/450; 455/451; 455/452.1
(58) Field of Classification Search .......... 370/329–333; 455/450–453
See application file for complete search history.

(56) References Cited

U.S. PATENT DOCUMENTS

| 6,480,718 | B1 | 11/2002 | Tse | |
|---|---|---|---|---|
| 7,069,009 | B2 * | 6/2006 | Li et al. | 370/329 |
| 7,423,991 | B2 * | 9/2008 | Cho et al. | 370/329 |
| 7,535,869 | B2 * | 5/2009 | Yoon et al. | 370/329 |
| 7,697,948 | B2 * | 4/2010 | Wan et al. | 455/509 |
| 7,818,023 | B2 * | 10/2010 | Li et al. | 455/522 |
| 7,835,750 | B2 * | 11/2010 | Khan | 455/447 |
| 2004/0106412 | A1 * | 6/2004 | Laroia et al. | 455/448 |
| 2007/0047569 | A1 | 3/2007 | Das | |

FOREIGN PATENT DOCUMENTS

WO WO 2007/022631 3/2007

OTHER PUBLICATIONS

"Voice over IP Resource Allocation Benefiting from Interference Coordination," R1-07-2568, 3GPP TSG RAN WG1 #49 Meeting, Kobe, Japan, May 7-11, 2007.
"Voice over IP Resource Allocation Benefiting From Interference Coordination," R1-07-2922, 3GPP TSG RAN WG1 #49bis Meeting, Orlando, USA, Jun. 25-29, 2007.
International Search Report & Written Opinion for PCT/US2008/007943, 12 pages, Oct. 17, 2008, Lucent Technologies Inc.
S. Das et al., "Interference Mitigation Through Interference Avoidance," Proc. Asilomar Conf. on Signals and Systems, Asilomar, CA, Nov. 2006, pp. 1815-1819.

* cited by examiner

*Primary Examiner* — Wayne Cai
*Assistant Examiner* — Huy C Ho
(74) *Attorney, Agent, or Firm* — Wall & Tong, LLP

(57) ABSTRACT

A method of dynamic resource allocations in wireless network is disclosed. The method provides that a base station in the network allocates resources to users independently of other base stations and without resource planning. Resource allocations are done based at least in part on a local optimization objective and a channel quality indicator from one or more users, and result in efficient resource reuse.

23 Claims, 6 Drawing Sheets

METHOD OF DYNAMIC RESOURCE ALLOCATIONS IN WIRELESS SYSTEMS

FIELD OF THE INVENTION

The present invention generally relates to a method of dynamic resource allocations in wireless systems.

BACKGROUND OF THE INVENTION

In wireless communications, users situated relatively far from a base station that serves them are generally more susceptible to interference from neighboring base stations and to signal attenuation. As a consequence, such users may experience relatively low signal-to-interference-and-noise ratios (SINRs). The relatively distant users are referred to as "cell edge users" or as users with "poor geometry." It will be understood that when one user is said to be more "distant" from the base station than another, what is meant does not depend solely on geographical distance, but also to susceptibility to other factors leading to attenuation and interference.

Several techniques with different degrees of complexity can be considered for out-of-cell interference mitigation in orthogonal frequency division multiple access (OFDMA) systems. Most of these schemes involve transmitting in any given cell over a portion of the spectrum that is smaller than the entire available bandwidth while neighboring cells employ a different portion of the spectrum. The primary goal of many of these techniques is to enhance the cell edge users' spectral efficiency and throughput at the expense of average sector throughput, or in some cases, with improved sector throughput as well. The interference mitigation schemes differ primarily in how the bandwidth occupied and transmitted power in a given sector are determined, and whether it is adapted as a function of the users being served, and whether it is coordinated across different cells.

For example, some schemes involve coordinated scheduling across multiple cells, in which bandwidth allocations are jointly determined across the cells on a per scheduling interval basis. Such schemes typically involve significant signaling between base stations, thus making them difficult to implement. Other schemes are based on static frequency partitioning or distributed coordination that do not involve signaling between base stations.

In an OFDMA system the transmission band is divided into a number of sub-carriers and information is transmitted by modulating each of the sub-carriers. Furthermore, time is divided into slots consisting of a number of OFDM symbols and transmissions are scheduled to users by assigning frequency resources (e.g., a set of logical sub-carriers) on specific slots. The logical sub-carriers are mapped to physical sub-carriers for transmission. The mapping can change from time to time and is referred to as frequency hopping. Frequency hopping is done to achieve interference averaging.

In OFDMA systems that support fractional frequency reuse (FFR) for interference mitigation, frequency and time resources (within an interlace period or frame that repeats periodically) are divided into several resource sets. Frequency hopping of sub-carriers is restricted to be within the sub-carriers of a resource set so that users scheduled on a certain resource set experience interference only from users scheduled in neighboring sectors in the same resource set. Each resource set is typically reserved for a certain reuse factor and is associated with a particular transmission power profile. For example, resource set 1 may be reserved for good geometry users in all sectors and resource set 2, 3, 4 for bad geometry users in sectors 1, 2, 3, respectively, in each cell resulting in ⅓ reuse for bad geometry users and universal reuse for good geometry users. Thus, fractional frequency reuse is achieved.

Fixed fractional frequency reuse does not adapt to traffic dynamics in the sense that the frequency reuse achieved is not adjusted based on interference conditions experienced by the users. Instead of a fixed partition of the available bandwidth leading fixed frequency reuse, it is possible to achieve dynamic frequency reuse through prioritized use of sub-carriers in the adjacent sectors. Interference avoidance is achieved by assigning different priority orders in the neighboring sectors so that when transmitting to cell edge users using sub-channelization, the neighboring interfering sectors transmit on different sub-carriers. Such a scheme was described in Das et al., "Interference mitigation through intelligent scheduling", Proc. Asilomar Conference on Signals and Systems, Asilomar, Calif., November 2006. For such an approach it is necessary to do frequency planning to determine the priorities and also dynamically adjust the thresholds under which users are assigned to different resource sets.

It is known that reuse patterns, such as the 1:3 reuse pattern of FIG. 1, are useful for reducing interference between neighboring sectors. As seen in FIG. 1, each cell (e.g., shown as hexagonal units 102, 104, 106) of a network is divided, according to a 1:3 reuse pattern, into respective α, β, and γ sectors. The three classes of sectors are geographically distributed in such a way that, ideally, two sectors of the same class (e.g., characterized by the same subcarrier frequency) do not share a common edge. As a consequence, interference can be reduced by assigning mutually disjoint sets of subcarriers to the respective sector classes. In such a situation, the three sector classes may be said to be "mutually orthogonal" with respect to their use of subcarriers. In the figure, the respective sets of sub-bands, each of which contains sets of subcarriers, are denoted as $f_1$, $f_2$, and $f_3$.

SUMMARY OF INVENTION

One embodiment of the present invention provides a method of dynamic allocation of resources in a wireless network with a number of base stations each associated with a number of reception areas, the method includes: each base station adaptively allocating resources to one or more users in each associated reception area based at least in part on one local optimization objective for each associated reception area and a channel quality indicator from the one or more users, the allocation of resources being done independently of other base stations, and interference is minimized between neighboring reception area through automatic resource reuse across the number of reception areas without resource planning prior to allocating the resources by each base station.

Another embodiment provides an apparatus for dynamic allocation of resources in a wireless network with a number of base stations each having respective associated reception areas, the apparatus includes: a base station adaptively allocating resources to one or more users in at least one associated reception area based at least in part on one local optimization objective and a channel quality indicator from the one or more users, the allocation of resources being done independently of other base stations, in which interference is minimized between neighboring reception areas through automatic resource reuse in the at least one associated reception area without resource planning prior to allocating the resources by the base station.

BRIEF DESCRIPTION OF THE FIGURES

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
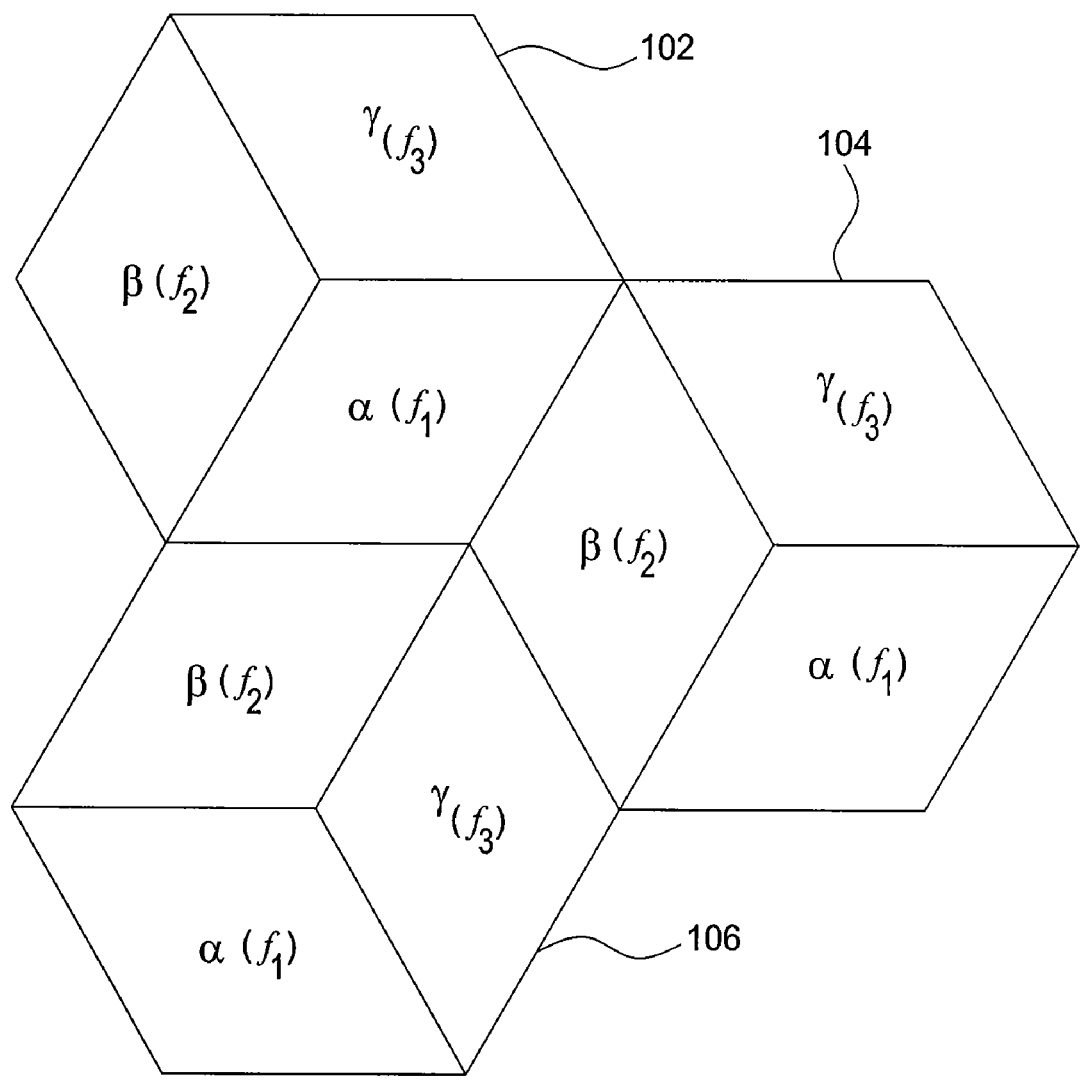
FIG. 1 is a schematic illustration of a fractional frequency reuse pattern.

The present invention provides a method for dynamic resource allocation to implement resource reuse, including fractional frequency reuse (FFR) and timeslot reuse, in wireless systems for maximizing system capacity and/or coverage. Specifically, each base station servicing its associated cell or sectors makes allocation decisions independently, i.e., without coordination with other base stations, or direct information of how band assignments are done in other base stations. The algorithm used for resource allocation is adaptive, e.g., resource allocation is done based in part on feedback received from mobile units or users, allowing for dynamic resource reuse such as frequency and timeslot reuse. Although frequency reuse may be used as examples in the following discussions, it is understood that the embodiments of the invention also apply generally to resource reuse.

Those skilled in the art will understand that a base station may serve a cell of a wireless network as a single, integral geographical unit, or the cell may be subdivided into sectors which are served independently of one another. The term "reception area" will be used to denote the smallest independent geographical unit served by a base station. Thus, depending on the specific circumstances, a reception area may be a cell, or it may be a sector or other geographical unit. In the following discussion, cells will be referred to in some places, and sectors in others. Such terminology should not be understood as limiting, because the principles to be described below may be applied irrespective of whether the pertinent reception area is a cell, a sector, or some other geographical unit.

Those skilled in the art will understand further that various formats for wireless communication include a relatively long time window which is subdivided into shorter time windows during each of which, for example, one user is served. Without limitation, the term "frame" will be adopted herein to denominate such a longer time window, and the term "slot" or "timeslot" to denominate the shorter time window. In particular, as used herein, the term "timeslot" encompasses "subframes" as a specific example.

It is further understood that resource planning, as used herein, includes frequency and timeslot planning performed offline (i.e., not real-time), and that "planning" also includes offline assignment of priorities for using different resources in different sectors, cells or reception areas in general. Although discussions of various examples may refer to frequency reuse or planning, it is understood that the methods and algorithms of the present invention also apply generally to resource allocations and reuse.

According to embodiments of the invention, each base station of a cell (sector or reception area) allocates its mobile units or users to the frequency bands based, at least in part, on a local optimization objective and a channel quality indicator, e.g., the level of interference the mobile unit receives in each of the bands. Examples of an optimization objective may include a minimization of the total power usage, minimization of the total weighted power usage (where power in one band may weigh more than in the other), a linear combination of power and frequency bandwidth, and so on.

Although examples below may be discussed with respect to resource allocations at the sector level, e.g., taking into account only local optimization objectives and constraints within each sector, embodiments of the invention can also be extended and applied to resource allocations at the cell level, e.g., by taking into account transmissions in other sectors of a cell being serviced by a specific base station.

The band allocation algorithm (or more generally, resource allocation algorithm), of a given base station is oblivious to, or independent of, how allocation is done by other base stations. Unlike conventional band assignment approaches, no explicit resource planning, e.g., frequency and/or timeslot planning, e.g., a priori band assignment performed offline or separately from the algorithm is needed.

However, the cells' optimization objectives and/or their parameters such as weighting factors can be set up in such a way that the resulting system-wide allocation of mobile units to the bands follows a very efficient FFR for improved performance, without the use of frequency planning. In other words, an efficient FFR happens "automatically", as a result of the implementation of the method of the present invention, without frequency assignments being done in advance. Furthermore, the FFR "induced" by the algorithm adapts, also "automatically", to the changing cell layout and/or mobile unit distribution and service requirements. Thus, interference between neighboring reception areas are minimized through automatic resource reuse across a number of reception areas.

Illustrative embodiments are discussed in the context of sub-carrier and power allocation in downlink of cellular systems based on orthogonal frequency division mulitple access (OFDMA) that achieve out-of-cell or out-of-sector interference avoidance through dynamic fractional frequency reuse, and algorithms are provided for both constant bit rate traffic such as Voice over Internet Protocol (VoIP) and variable bit rate best effort traffic such as web browsing. The algorithms are adaptive and adjust the resource allocation to time varying channel conditions and traffic patterns to maximize performance. Unlike conventional approaches, these algorithms do not require any a priori frequency planning for achieving fractional reuse, although frequency planning may be used to enhance performance.

Although embodiments of the present invention are discussed for OFDMA systems, they are generally applicable to multichannel code division multiple access (CDMA) systems and other multichannel wireless systems.

In one embodiment, a "shadow scheduling" algorithm is used by a base station to optimize a local objective in real time, in a computationally efficient manner. The shadow scheduling algorithm has been mathematically proven to indeed optimize the local objective.

For illustrative purpose, an OFDMA system with J sub-bands is used in this example. (Sub-bands are logical. Physically, a sub-band is an arbitrary fixed subset of sub-carriers, possibly from across the entire band.) For simplicity, a resource set is considered to consist only of frequency domain sub-bands defined in all timeslots. However, the algorithms described below can readily be extended to more general resource sets. Furthermore, in this example, all sub-bands are assumed to have the same number of sub-carriers, referred to as capacity c. In general, however, the sub-bands may have different number of sub-carriers.

Embodiments of the present invention provide algorithms suitable for use with both constant bit rate (CBR) traffic and best effort (BE) traffic, as discussed below.

As used herein, a constant bit rate (CBR) type traffic flow refers to a data flow in which, in general, a certain amount of data needs to be delivered to a mobile user at regular, typically fixed length, time intervals, and typically with the specified, low delay requirement. It is also possible to allow for some variations in the amount of data within each interval and/or variations in the interval duration. A voice-over-IP (VoIP) is a standard example of a CBR data flow.

A best effort (BE) type traffic flow refers to a data flow in which, in general, the system has freedom to choose the amount of data delivered to the user, typically with non-strict, or even non-existent, delay requirements. The system objective with respect to BE users is to allocate resources to them in a fair fashion. A typical example of a BE flow is a large file download. Some BE flows, however, may have explicit or implicit average rate requirements, over relatively large time intervals (of the order of 1 second or more). A typical example is an audio/video stream.

Algorithm for CBR Traffic

In the algorithm for use with CBR traffic, for each sub-band j, there is a parameter $a_j \geq 0$, which is the "unit cost of power" for the power used on this sub-band. The default values may be $a_j=1$. (For the purposes of "inducing" fractional frequency reuse (FFR), power usage on some carriers may be made more expensive, e.g., by setting $a_j>1$.)

Let I denote the number of CBR-type traffic flows, which may, for example, be VoIP. The set of these flows is in fact not constant, and instead, varies with time. But the set changes relatively slowly. Assume also that each activity period ("talk spurt") is a separate flow. Let $m_{ij}$ denote the number of sub-carriers that flow i needs to be allocated if it is assigned to sub-band j. Also, let $p_{ij}$ denote a "medium-term" (e.g., over the order of 1 second intervals) average transmit power that will need to be allocated to flow i, if flow i is assigned to sub-band j.

Both $m_{ij}$ and $p_{ij}$ are estimated based on feedback received from users within a sector—or more generally, a reception area, at certain predetermined intervals, e.g., one skilled in the art will know how $m_{ij}$ and $p_{ij}$ can be computed from one or more channel quality indicators (CQI), such as signal-to-interference-and-noise (SINR) ratio that captures the effect of interference, from users' feedback. Since both $m_{ij}$ and $p_{ij}$ are determined by a medium-term (e.g., about 1 second intervals) average channel quality received for each resource set, they change relatively slowly and there is no need for frequent channel quality information feedback. In addition, $m_{ij}$ and $p_{ij}$ are typically highly correlated, since they both depend on the channel quality (although this feature is not required for the algorithm described below).

For the purpose of this discussion, CBR-type flows, with tight delay requirements, are given absolute priority over other traffic types. Their assignment to the sub-bands has an objective of minimizing the total cost of power. (If all $a_j=1$, the objective is to minimize total power usage. In this case, if $m_{ij}$ and $p_{ij}$ indeed have strongly positive correlation, the total sub-carrier usage is also reduced as well.) The constraints are the sub-band capacities c and the total available power p* on all sub-bands. Formally, if A(j) is the set of flows assigned to sub-band j, the desired assignment A=(A(j)) seeks to minimize the term shown in Eq. (1) below, subject to the two constraints shown in Eq. (2) and (3):

$$\min_{\{A(j)\}} \sum_j \sum_{i \in A(j)} a_j p_{ij} \qquad \text{Eq. (1)}$$

subject to the following conditions:

$$\sum_j \sum_{i \in A(j)} p_{ij} \leq P_{tot} \qquad \text{Eq. (2)}$$

$$\sum_{i \in A(j)} m_{ij} \leq N_j \qquad \text{Eq. (3)}$$

The optimization problem can be understood as trying to minimize power and subcarrier usage, and leave as much resource as possible to other traffic types. An additional, implicit objective is to "shift" power used by the sector to its "cheaper" sub-bands, and thus minimize the interference this sector creates on its more "expensive" sub-bands. Thus, the sub-band(s) that are typically assigned to bad geometry users in the sector are provided at a lower cost, while sub-bands that will typically be used by bad geometry users in interfering neighboring sectors are provided at a higher cost. This can be thought of as trying to create a soft frequency reuse pattern, which induces a good system-wide FFR.

Note that while the optimization objective Eq. (1) is a reasonable one, it is certainly not the only reasonable, "individual" sector objective to induce an efficient system-wide FFR. For example, one may try to explicitly include sub-carrier usage into the objective. It is contemplated that other objectives may also be acceptable.

In addition, in assigning users to sub-bands, the algorithm may also incorporate one or more of the following features, e.g., avoiding frequent reassignment of CBR-type flows (to reduce the downlink signaling overhead), or providing a simple way to adapt automatically to an "evolving" set of users and their "evolving" service requirements $m_{ij}$ and $p_{ij}$.

Figure 2:
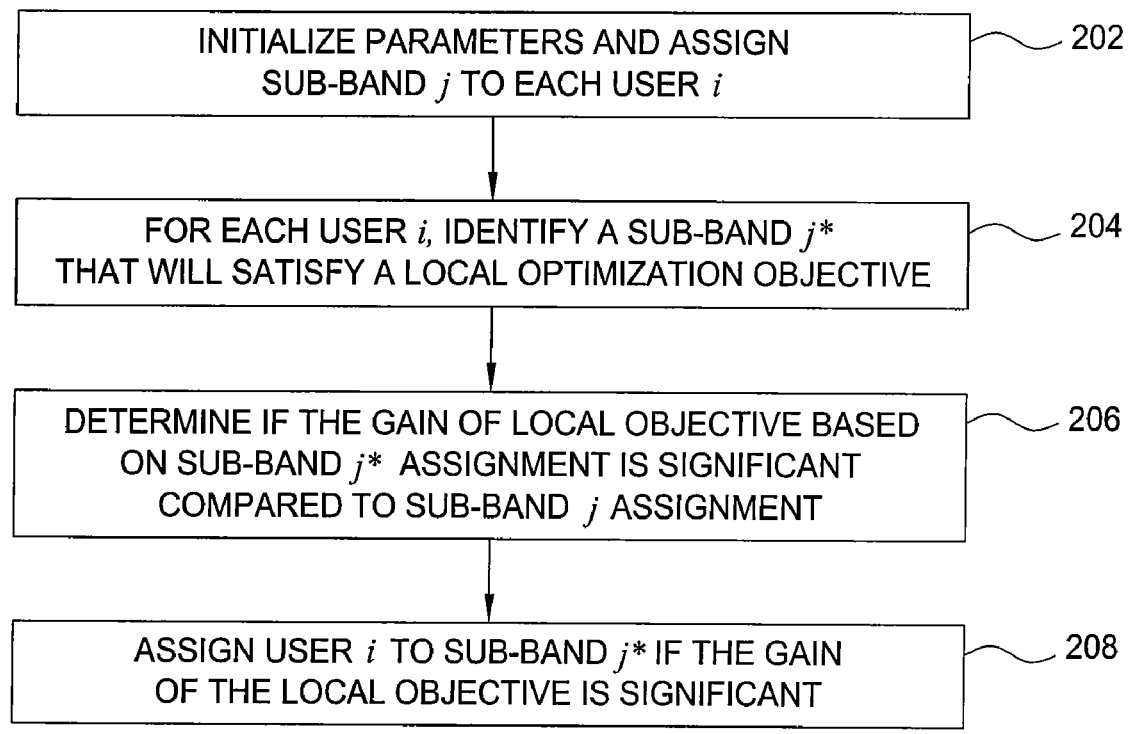
FIG. 2 is a schematic illustration of a method for allocating resources for constant bit rate traffic flow.

FIG. 2 illustrates schematically a method of assigning sub-bands to users or CBR traffic flows. It is understood that assigning a "sub-band" to a user or flow means that a set of sub-carriers in that sub-band is assigned to that user or flow, but not the entire sub-band itself. The method 200 begins in step 202 by assigning a sub-band, j, to each user or traffic flow i, while initializing two parameters used for keeping track of two constraints: a power constraint and the number of sub-carriers required for flow i, if flow i is assigned to carrier j. In step 204, in each time interval selected for band assignment update (e.g., may be a time slot), for a given flow i, identify a sub-band j* that will satisfy a local optimization objective. In this example, the objective is one of minimizing a term that is indicative of power and subcarrier usage for flow i.

After j* has been identified, a determination is made as to whether the minimized power and subcarrier usage provides a significant gain compared to the power and subcarrier usage under the initial sub-band assignment, as shown in step 206. If the gain satisfies a predetermined criterion, e.g., if the power and subcarrier usage savings exceeds a predetermined threshold, then sub-band j* can be assigned to flow i. Otherwise, flow i retains its initial sub-band j. This sub-band assignment based on the local optimization objective is done for all users or traffic flows at each suitable time interval.

If the integrality constraints in Eq. (1)-Eq. (3) are relaxed, which is reasonable if one assumes that $m_{ij}$ is typically much smaller than c, then Eq. (1)-Eq. (3) is a linear program and the following simple "shadow scheduling" algorithm provably solves it, as shown by Stolyar, "Maximizing Queuing Network Utility subject to Staility: Greedy Primal-Dual Algorithm" in Queueing Systems, vol. 50, pp. 401-457 (2005).

Figure 3:
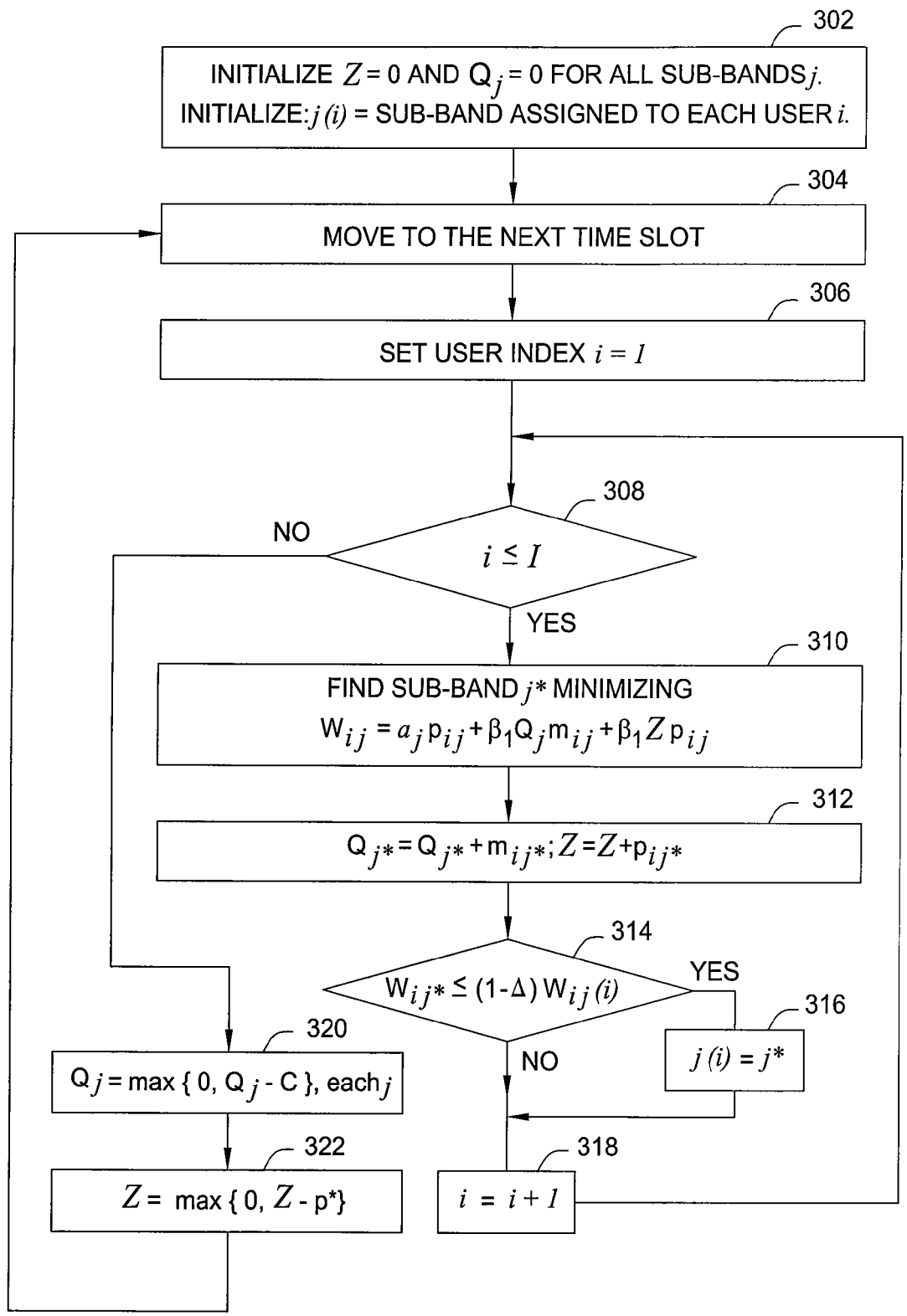
FIG. 3 is a flow chart illustrating one embodiment of an algorithm for use with constant bit rate traffic.

FIG. 3 shows a flow chart of an algorithm for implementing the method 200. In the shadow algorithm 300, initialization of two parameters Z, $Q_j$ and initial assignment of sub-bands are performed in block 302. Z represents a virtual ("ficticious") queue that keeps track of the total power constraint of Eq. (2), while $Q_j$ represents a virtual queue for each sub-band j to keep track of the constraint Eq. (3). A small parameter, $\beta_1 > 0$ is also provided for controlling a tradeoff between responsiveness of the algorithm and its accuracy. In one embodiment, $\beta_1$ is equal to 0.01. For example, the initial state can be: $\beta_1 Q_j = 1$ for all j and Z=0. Although a good choice of initial state is important, it is not crucial.

In block 304, the time slot for sub-band allocation is advanced to the next slot, and a first user (or traffic flow) is selected by setting the user index i to 1, as shown in block 306. In block 308, a comparison is made as to whether the flow index i is less than or equal to the total number of flows I.

If the answer is "yes", then the method proceeds to block 310, which identifies a sub-band j*, belonging to a resource set B(i) assigned to user i, that would minimize a term $W_{ij}$. $W_{ij}$ is indicative of a power and subcarrier usage, and in this example, is given by:

$$W_{ij} = a_j p_{ij} + \beta_1 Q_j m_{ij} + \beta_1 Z p_{ij} \quad \text{Eq. (4)}$$

In Eq. (4), the first term $a_j p_{ij}$ represents a cost of power, the second term is indicative of the sub-band capacity constraint, and the third term is indicative of the total power constraint. In another embodiment, in particular in the case when all parameters $a_j$ are equal, the third term is omitted from $W_{ij}$, so that the minimization in block 310 is done only for the sum of the first two terms. In one embodiment, $a_j$ is equal to 1 for all j, and $\beta_1$ is equal to 0.01.

In block 312, parameters $Q_j^*$ and Z are updated according to: $Q_j = Q_j + m_{ij}$ and $Z = Z + p_{ij}$. This can be interpreted as "routing" one unit of flow i traffic to queue j, and consuming amount $p_{ij}$ of power.

In decision block 314, a query is performed to evaluate the gain resulting from the sub-band j* assignment. Specifically, the term, $W_{ij}^*$ for the j* sub-band, is compared with $W_{ij}$ for the initial sub-band j according to the equation: $W_{ij}^* \leq (1-\Delta) W_{ij}(i)$ shown in block 314, with a predetermined parameter $\Delta$ being used in this comparison step. If the answer is "yes", e.g., the gain is considered sufficient to justify a sub-carrier re-assignment, then flow i is re-assigned to sub-band j*, as shown in block 316. Otherwise, flow i retains its existing sub-band j.

By providing a "gain threshold" as a criterion, one can avoid frequent re-assignments of sub-bands. That is, flow i is re-assigned from its current sub-band $j \notin B(i)$ to another sub-band $k \in B(i)$ only if the gain satisfies the criterion determined by:

$$a_k p_{ik} + \beta_1 Q_k m_{ik} + \beta_1 Z p_{ik} < (1-\Delta)(a_j p_{ij} + \beta_1 Q_j m_{ij} + \beta_1 Z p_{ij})$$

The assessment as to whether to re-assign a sub-band can be done by obtaining a difference or a ratio between the term $W_{ij}^*$ (with a re-assigned sub-band j*) versus the term $W_{ij}$ (with the current sub-band j), and comparing the difference or ratio to a predetermined threshold value.

In block 318, the flow index i is increased by one for the next user or flow. The process is repeated starting from blocks 308 for all traffic flows i.

After all flows i have been processed for sub-band assignment, as determined by a "no" answer in block 308, parameters $Q_j$ and Z are set to appropriate values as shown in blocks 320 and 322, respectively. In block 320, for each j, $Q_j$ is updated by: $Q_j = \max\{Q_j - c, 0\}$, i.e., $Q_j$ is set to the larger of either $Q_j - c$, or 0. In block 322, Z is updated by $Z = \{Z - p, 0\}$. The entire process then repeats for the subsequent time slot, as shown in block 304.

The above algorithm provides a simple and robust way of performing sub-band assignments. For example, if the initial estimates of $m_{ij}$ and $p_{ij}$ are reasonable, then even the initial assignment of a flow i would be reasonable. If, however, the "new" flow is in fact a new talk spurt of an existing "session", the last estimated values of $m_{ij}$ and $p_{ij}$ can be used as new estimates. Even if a bad initial assignment has been made, it can be improved by subsequent reassignments as estimates of $m_{ij}$ and $p_{ij}$ get better. Moreover, even though the algorithm solves the problem Eq. (1)-Eq. (3) assuming set of flows and all $m_{ij}$ and $p_{ij}$ are constant, it is robust with respect to $m_{ij}$ and $p_{ij}$ changing with time, if such changes are relatively slow. Thus, the algorithm "tracks" the optimal solution of Eq. (1)-Eq. (3) as $m_{ij}$ and $p_{ij}$ change, by doing simple updates of variables in each step.

In this example, the optimization objective and constraints are considered for resource allocations at the sector level. However, in general, the $m_{ij}$ and $p_{ij}$ can also be estimated at the cell level by taking into account transmissions in other sectors of a cell.

Furthermore, the algorithm induces "good" FFR, namely, low-geometry flows in neighboring interfering sectors will avoid interference from each other by moving to different sub-bands. High geometry users in neighboring sectors will be able to share same sub-bands. This happens automatically through implementation of the algorithm, i.e., without any frequency planning, and results in aggregate system capacity improvement.

Figure 4B:
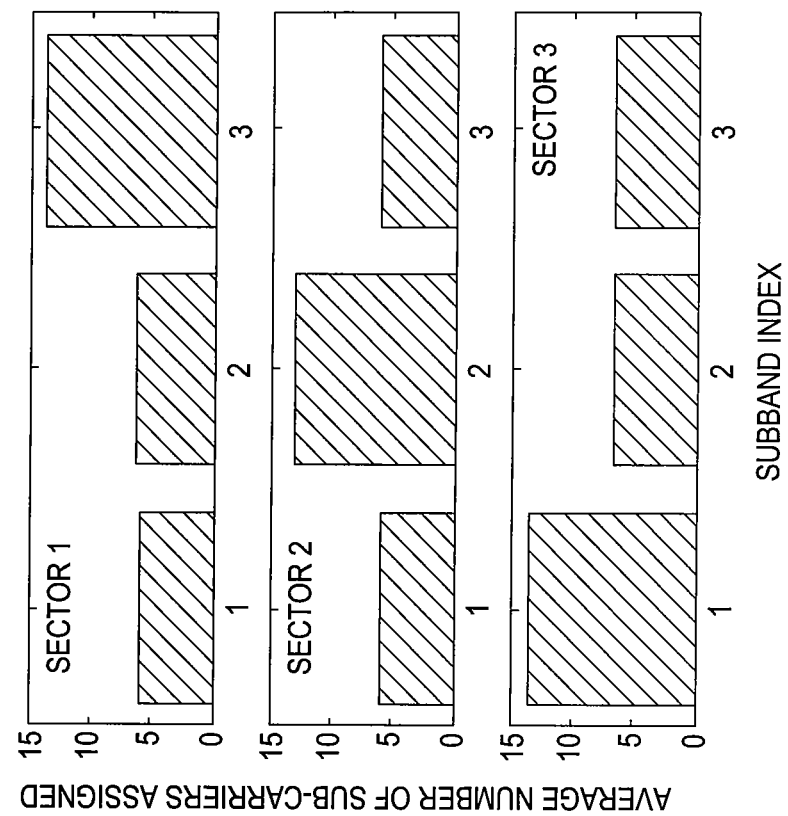
FIGS. 4A-B are results for a three-sector simulation using the algorithm for constant bit rate traffic.
Figure 4A:
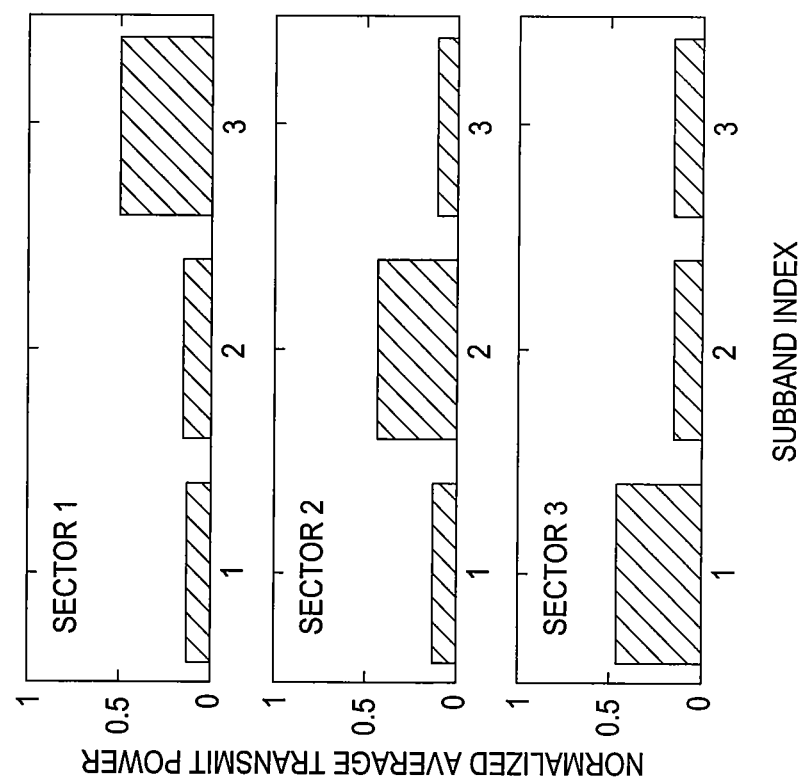

FIGS. 4A-B illustrate results for a simulation involving three sectors and three sub-bands using the algorithm of FIG. 3. FIG. 4A shows a plot of the average transmit power versus the sub-band index (j=1, 2 and 3) for each of the three sectors, indicating clearly the resulting FFR pattern, which is automatically induced by the resource allocation method of the present invention. FIG. 4B shows a plot of the number of sub-carriers assigned versus the sub-band index (j=1, 2 and 3) for each of the three sectors, also indicating that an efficient FFR pattern is automatically induced.

Algorithm for Best Effort Traffic Flows

For Best Effort traffic type, a different method is used. One embodiment involves a two-part process, which can be implemented using two algorithms run by each sector (or more generally, run by each reception area). The first algorithm is referred to as a shadow algorithm, which determines a good power allocation and constantly updates the power allocation $p_j$ (where j=1, ..., J) to each of the sub-bands j, subject to the total power constraint $\Sigma_j p_j \leq p^*$. The second algorithm is referred to as the actual scheduling algorithm, which assigns each sub-band according to the power allocation provided by the shadow algorithm, and determines which user is scheduled in each sub-band in each time-slot.

Although the example below illustrates resource allocations based on local optimization at the sector level, it can also be extended to resource allocations and optimization at the cell level.

Figure 5:
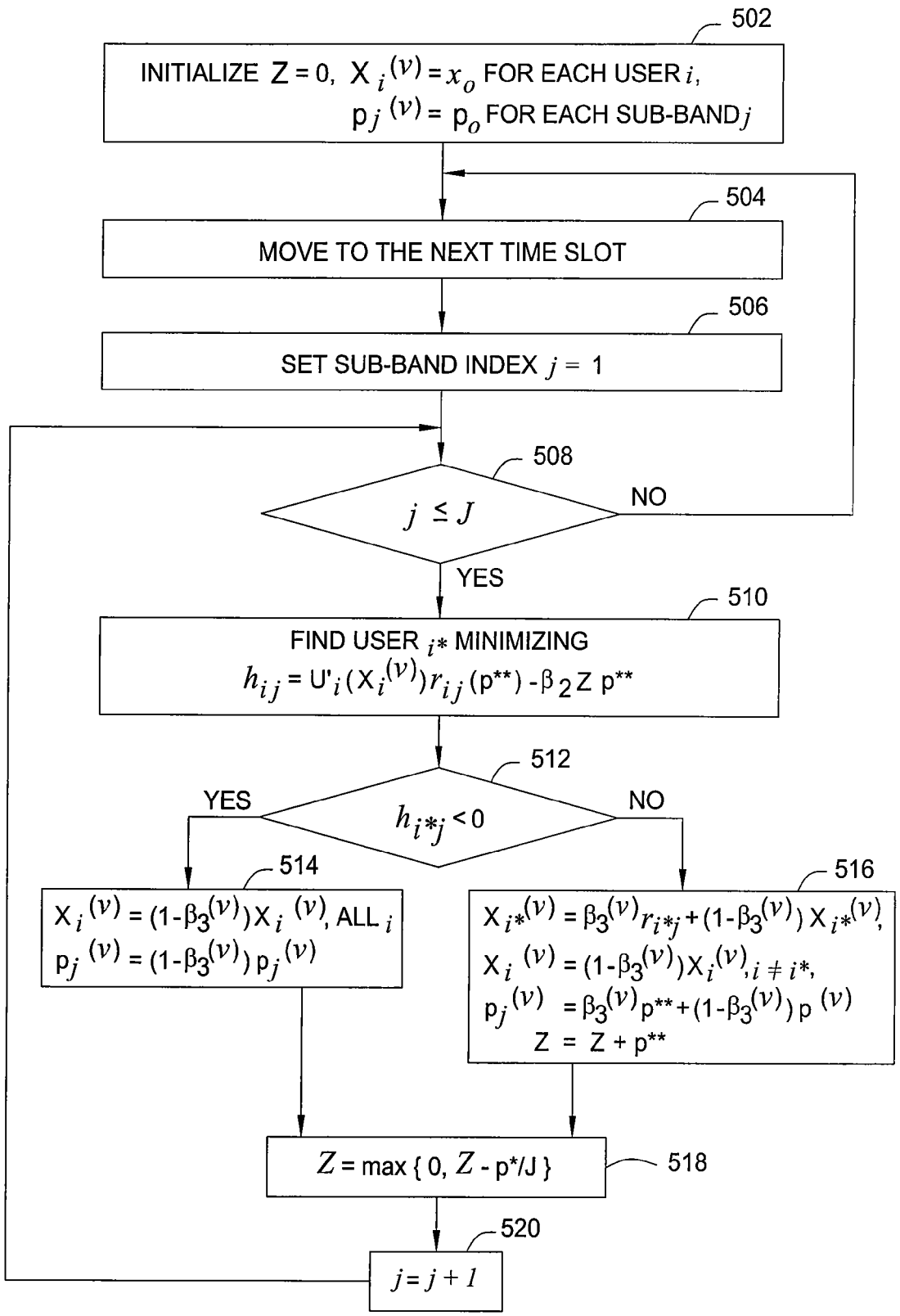
FIG. 5 is flow chart illustrating one embodiment of an algorithm for power allocations to sub-bands in best effort traffic flows.

FIG. 5 shows a flow chart for one example of the shadow algorithm 500. The shadow algorithm performs "virtual scheduling" of users within a reception area, e.g., a sector, for transmission so as to solve the problem of: $\max \Sigma_i U_i(X_i^{(v)})$, i.e., maximizing the utility for all users, where $U_i(X_i^{(v)})$ determines a "utility" of user i as a function of the average transmission data rate $X_i^{(v)}$ that is provided by the shadow algorithm to this user, subject to the constraint that the average total power used is at most p*. (The superscript $^{(v)}$ is used to denote a virtual quantity assigned by the shadow algorithm.) $U_i$ is generally a concave, non-decreasing function of $X_i$.

A fixed parameter p**>p*/J is provided, such that in any time slot and in any sub-band j, the allocated power can be either p** or 0. The assumption of the shadow algorithm is that at most one user can be scheduled in a given sub-band in any time slot.

The algorithm maintains a virtual ("ficticious") queue Z to keep track of the total power constraint, and also maintains and updates current values of a user's transmission data rate $X_i^{(v)}$ and current average power usage $p_i^{(v)}$ in each sub-band.

In block 502, parameters Z and $X_i^{(v)}$ are initialized, and an initial power allocation is made to each sub-band j according to $p_j^{(v)} = p_o$, where $p_o$ is an initial power value. For example, the initial state may be Z=0 and $X_i^{(v)} = x_0$ for all i, where $x_0 > 0$ and is a fixed constant. In one embodiment, $x_0$ is equal to 1.

In block 504, the time slot (or another selected time interval) for power allocation update is advanced to the next slot, and in block 506, a first sub-band j is selected by setting the index j to 1. In block 508, a comparison is made as to whether the sub-band index j is less than or equal to the total number of sub-bands J.

If the answer is "yes", then the method proceeds to block 510, which identifies a user i* that will satisfy an optimization objective for sub-band j in the current time slot. In this example, the objective is one of maximizing a term, $h_{ij}$, which is equal to $U'_i(X_i^{(v)})r_{ij}(p^{}) - \beta_2^{(v)} Z p^{}$, where $U'_i$ is a derivative of $U_i$, and $r_{ij}(p^{})$ denotes an instantaneous transmission data rate within a timeslot that user i will get, if user i is scheduled for transmission in sub-band j with power p, and with all sub-carriers (within this sub-band) allocated to the transmission. The instantaneous rate $r_{ij}(p^{})$ is estimated by the algorithm based on users' feedback, e.g., one or more CQIs received from users at certain predetermined time intervals. In another embodiment, the algorithm may be extended to the cell level by requiring that the $r_{ij}$ terms take into account only out-of-cell (not out-of-sector) interferences and obtaining power allocation for each sector and then jointly assigning users within a cell for all sectors. $U'_i(X_i^{(v)})$ represents the user's current marginal utility, i.e., the increase of user utility per unit increase of its average rate $X_i^{(v)}$. Then, the first term represents the increase in system utility if user i is to be served at the instantaneous data rate of $r_{ij}$ in the given timeslot. The product $\beta_2^{(v)} Z$ in the second term represents a current cost of power usage, and the second term $\beta_2^{(v)} Z p^{}$ represents the power cost to the system if power p** is allocated.

The small positive parameter, $\beta_2^{(v)}$, controls the tradeoff between responsiveness of the algorithm and its accuracy. The value of $\beta_2^{(v)}$ is set in advance, and not adjustable within the algorithm. For example, in one embodiment, $\beta_2^{(v)}$ is equal to 0.01, and p** is set equal to 1.5p*.

In block 512, a determination is made as to whether $h^*_{i^*j}$ is less than zero or not. If the answer is "yes" (i.e., $h^*_{i^*j}$ is negative), then block 514 sets the values for $X_i^{(v)}$ and $p_j^{(v)}$ according to: $X_i^{(v)} = (1-\beta_3^{(v)}) X_i^{(v)}$ for each user i, and $p_j^{(v)} = (1-\beta_3^{(v)}) p_j^{(v)}$. $\beta_3^{(v)}$ is another small positive parameter, controlling the tradeoff between responsiveness of the algorithm and its accuracy. In one embodiment, $\beta_3^{(v)}$ is equal to 0.001.

If the answer in block 512 is "no", the algorithm proceeds to block 516, in which the following power allocation $p_j^{(v)}$ and transmission rate allocations are made.

$$Z = Z + p^{**},$$

$$p_j^{(v)} = \beta_3^{(v)} p^{**} + (1-\beta_3^{(v)}) p_j^{(v)},$$

$$X_i^{*(v)} = \beta_3^{(v)} r_{i^*j}^*(p^{**}) + (1-\beta_3^{(v)}) X_i^{*(v)} \text{ for the chosen user i*, and}$$

$$X_i^{(v)} = (1-\beta_3^{(v)}) X_i^{(v)} \text{ for all other users.}$$

That is, the average data rate for user i* is different from the data rates for other users.

In block 518, Z is updated according to $Z = \max\{Z - p^*/J, 0\}$, which means that Z is decremented by p*/J, the maximum allowed average (across sub-bands) power usage per sub-band, but Z is not allowed to go below 0. In block 520, the sub-band index is increased by 1, and the algorithm repeats from block 508. The power allocation, $p_j^{(v)}$, generated by this scheduling algorithm is provided for use in the second algorithm related to actual scheduling.

Figure 6:
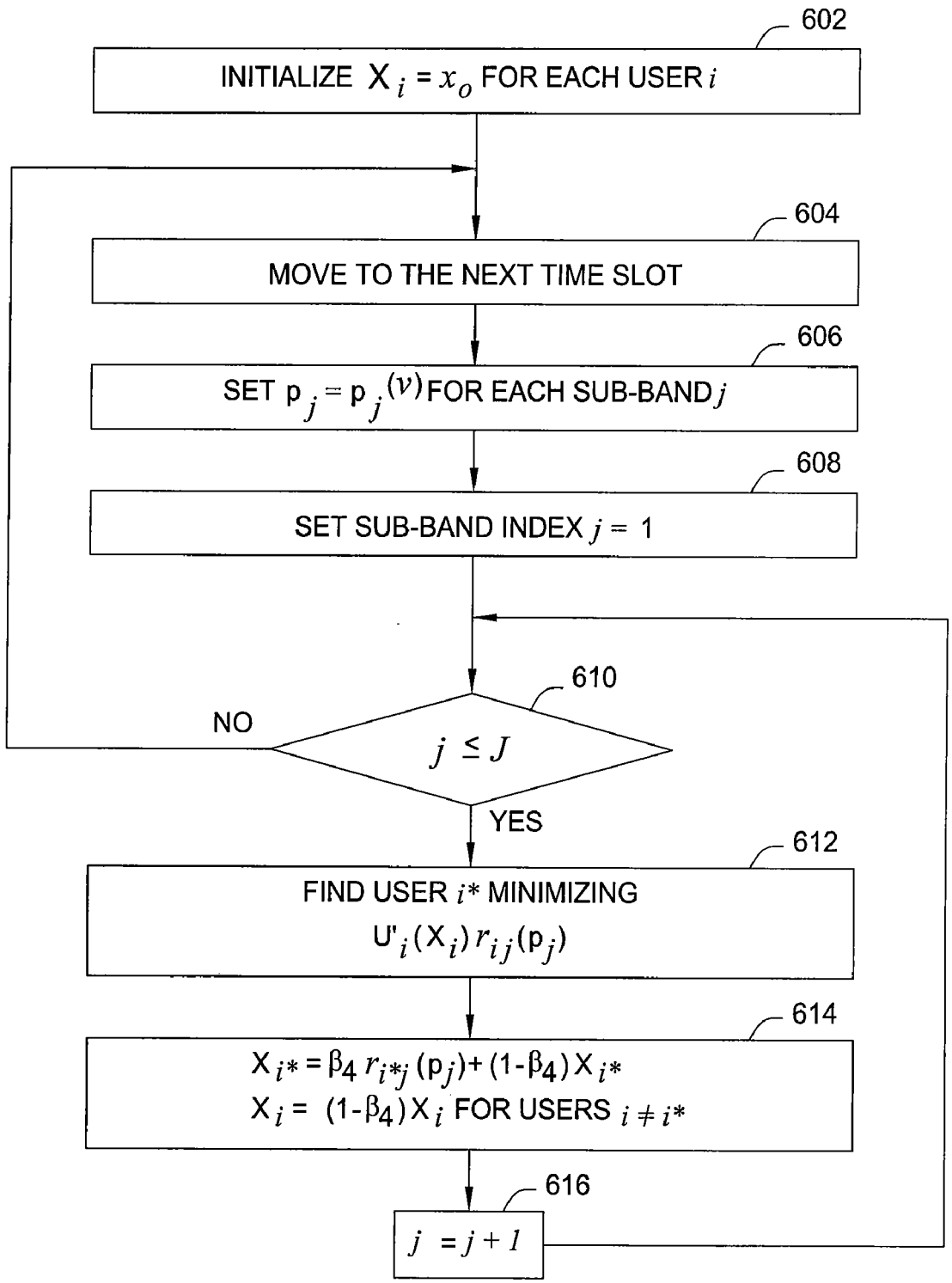
FIG. 6 is a flow chart illustrating one embodiment of another algorithm for use in conjunction with the algorithm of FIG. 5 for scheduling best effort traffic.

FIG. 6 shows a flow chart for one example of the actual scheduling algorithm 600. In block 602, the average transmission data rate $X_i$ is initialized for each user i. For example, the initial state may be: $X_i = x_0$ for all i, where $x_0$ is a fixed positive constant. In one embodiment, $x_0$ is equal to 1. In block 604, the time slot is advanced to the next slot. In block 606, the actual power $p_j = p_j^{(v)}$ is allocated to each sub-band j according to the values provided by the shadowing algorithm of FIG. 5.

The actual algorithm schedules one or more users in a given sub-band in each slot. The goal of the algorithm is to maximize the utility for all users, i.e., solve the problem: $\max \Sigma_i U_i(X_i)$, where $X_i$ is the average actual rate given to user i (by actual algorithm). For simplicity, FIG. 6 shows one embodiment of the actual algorithm that schedules at most only one user in a given sub-band in any slot. In general, however, one or more users may be assigned to each sub-band within each timeslot.

The sub-band index j is set to 1 in block 608. In block 610, a comparison is made as to whether the sub-band index j is less than or equal to the total number of sub-bands J. If the answer is "no", the algorithm proceeds to block 604 for processing of the next time slot. If the answer is "yes", then the method proceeds to block 612, which identifies a user i* that will satisfy a local optimization objective.

In this example, the objective is one of maximizing the term $U'_i(X_i)r_{ij}(p_j)$, which represents the utility of user i in sub-band j, with an instantaneous data rate $r_{ij}$. If the first user does not have enough bits to be sent, a second user can be scheduled in the same sub-band.

In block 614, the transmission data rate for user i* is set to $X_i^* = \beta_4 r_{i^*j}^*(p_j) + (1-\beta_4) X_i^*$ for the chosen user i, and $X_i = (1-\beta_4) X_i$ for all other users. In block 616, the sub-band index is increased by 1, and the algorithm proceeds to block 610 to see if all sub-bands j have been processed. $\beta_4$ is another small positive parameter, controlling the tradeoff between responsiveness of the algorithm and its accuracy. In one embodiment, $\beta_4$ is equal to 0.005.

As illustrated herein, embodiments of the present invention provide a method of dynamic resource allocations that adapts to changes in system layout or user distribution such that fractional frequency reuse can be efficiently implemented to avoid or minimize interference between neighboring sectors. Unlike conventional methods, the present method does not require any a priori resource planning such as frequency or timeslot planning. Instead, frequency band assignments are done dynamically and in real-time. Furthermore, each base station performs resource allocations independently of other base stations, e.g., does not require any direct signaling exchange with other base stations, and resource allocations are determined based at least in part on one local optimization objective (for the reception area, e.g., cell or sector, that it services) and a channel quality indicator or feedback from one or more users or mobile units. Based on the channel quality indicators received from one or more users in the reception area, estimates of relevant parameters can be arrived at for use in algorithms for resource allocations.

While the foregoing is directed to embodiments of the present invention, other and further embodiments of the invention may be devised without departing from the basic scope thereof, and the scope thereof is determined by the claims that follow.

The invention claimed is:

1. A method of dynamic allocation of resources in a wireless network that includes a number of base stations, each base station associated with one or more reception areas, the method comprising:
    each base station adaptively allocating resources to one or more users in each associated reception area according to a respective local optimization objective including shifting reception area power from higher cost sub-bands toward lower cost sub-bands and a channel quality indicator from the one or more users, the adaptive allocation of resources at each base station being done independently with respect to other base stations;
    identifying for each sub-band a user for which a second term indicative of a utility charge to the user is maximized; and
    updating an actual average data rate to the identified user that is different from the actual average data rates for other users.

2. The method of claim 1, wherein the resource comprises at least one of a plurality of transmission frequency sub-bands, transmission time slots and transmission power.

3. The method of claim 1, wherein the local optimization objective relates only to each reception area associated with the base station, and includes at least one of maximizing a number of traffic flows in the associated reception area, minimizing total transmission power allocation, and maximizing a number of constant bit rate traffic flows.

4. The method of claim 1, wherein the local optimization objective is a function of a traffic flow type.

5. The method of claim 4, wherein the traffic flow type includes at least one of a constant bit rate traffic flow and a best effort traffic flow.

6. The method of claim 4, wherein the traffic flow type is a constant bit rate traffic, and the local optimization objective includes minimizing a total cost of transmission power allocation within the associated reception area.

7. The method of claim 6, wherein the resource allocating by each base station further comprises:
    minimizing transmission power and sub-carrier usage within the associated reception area for the base station subject to constraints of sub-band capacity and total power available on all sub-bands in the associated cell.

8. The method of claim 6, wherein the resource allocating further comprises:
    (a) assigning an initial sub-band to each user;
    (b) for each user, identifying a new sub-band different from the initial assigned sub-band that, when allocated to that user, will minimize a sum of: a first term indicative of a cost of power and a second term indicative of the sub-band capacity constraint;
    (c) updating a parameter in the second term in accordance with the sub-band capacity constraint;
    (d) assigning the new sub-band to the user if the minimized sum meets a predetermined criterion, and retaining the initial sub-band for the user if the minimized sum does not meet the predetermined criterion; and
    (e) repeating steps (b), (c) and (d) for each subsequent time slot.

9. The method of claim 8, wherein the sum in step (b) being minimized further includes a third term indicative of the total power constraint, and step (c) further comprises updating a parameter in the third term in accordance with the total power constraint.

10. The method of claim 8, wherein the predetermined criterion includes comparing one of a difference or a ratio between the minimized sum for the new sub-band and a corresponding sum for the initial sub-band with a predetermined decision threshold value.

11. The method of claim 4, wherein the traffic flow type is a best effort traffic, and the local optimization objective includes at least one of improving throughput for reception area edge users, or maximizing reception area utility by minimizing interference between neighboring reception areas through automatic resource reuse.

12. The method of claim 11, wherein the resource allocating further comprises:
    (a) determining and updating power allocations to each sub-band, subject to a constraint of total power for all sub-bands;
    (b) allocating an actual power to each sub-band in accordance with the determined power allocations from step (a); and
    (c) assigning one or more users to each sub-band within each timeslot.

13. The method of claim 12, wherein step (a) further comprises:
    (a1) assigning an initial power to each sub-band and an initial average data rate to each user;
    (a2) for each sub-band, identifying a user for which a first term indicative of a utility charge to the user is maximized, the first term including a parameter related to the total power constraint;
    (a3) determining whether the first term is less than zero; and
    (a4) determining an average data rate for each user and determining a power allocation to each sub-band based on whether the term is less than zero.

14. The method of claim 13, wherein (a4) further comprises:
    if the first term is not less than zero, providing a non-zero power allocation to the identified user in the sub-band for which the first term is maximized, and updating the average data rates allocated to all users, the average data rate allocated for the identified user being different from those allocated to other users.

15. An apparatus for dynamic allocation of resources in a wireless network comprising a number of base stations each having respective associated reception areas, the apparatus comprising:
    a base station adaptively allocating resources to one or more users in at least one associated reception area according to a respective local optimization objective including shifting reception area power from higher cost sub-bands toward lower cost sub-bands and a channel quality indicator from the one or more users, the adaptive allocation of resources at each base station being done independently with respect to other base stations;

identifying for each sub-band a user for which a second term indicative of a utility charge to the user is maximized; and updating an actual average data rate to the identified user that is different from the actual average data rates for other users.

16. The apparatus of claim 15, wherein the resource comprises at least one of a plurality of transmission frequency sub-bands, transmission time slots and transmission power.

17. The apparatus of claim 15, wherein the local optimization objective relates only to the at least one reception area associated with the base station, and includes at least one of maximizing a number of traffic flows, minimizing total transmission power allocation, and maximizing a number of constant bit rate traffic flows.

18. The apparatus of claim 15, wherein the local optimization objective is a function of a traffic flow type.

19. The apparatus of claim 18, wherein the traffic flow type includes at least one of a constant bit rate traffic flow and a best effort traffic flow.

20. The apparatus of claim 18, wherein the traffic flow type is a constant bit rate traffic, and the local optimization objective includes minimizing a total cost of transmission power allocation within the associated reception area.

21. The apparatus of claim 20, wherein the resource allocating by the base station further comprises:
minimizing transmission power and sub-carrier usage within the associated reception area for the base station subject to constraints of sub-band capacity and total power available on all sub-bands in the associated reception area.

22. The apparatus of claim 19, wherein the traffic flow type is a best effort traffic, and the local optimization objective includes at least one of improving throughput for reception area edge users, or maximizing reception area utility by minimizing interference between neighboring reception areas through automatic resource reuse.

23. The apparatus of claim 22, wherein the resource allocating further comprises:
(a) determining and updating power allocations to each sub-band, subject to a constraint of total power for all sub-bands;
(b) allocating an actual power to each sub-band in accordance with the determined power allocations from step (a); and
(c) assigning one or more users to each sub-band within each timeslot.

* * * * *